(12) United States Patent  
Fuller et al.

(10) Patent No.: US 8,764,980 B2  
(45) Date of Patent: Jul. 1, 2014

(54) FILTRATION SYSTEM AND METHOD

(75) Inventors: Ralph Fuller, Conroe, TX (US); Mark Mickan, Hockley, TX (US)

(73) Assignee: Porous Media Corporation, St. Paul, MN (US)

( * ) Notice: Subject to any disclaimer, the term of this patent is extended or adjusted under 35 U.S.C. 154(b) by 51 days.

(21) Appl. No.: 13/114,748

(22) Filed: May 24, 2011

(65) Prior Publication Data

US 2011/0284452 A1    Nov. 24, 2011

Related U.S. Application Data

(60) Provisional application No. 61/347,742, filed on May 24, 2010.

(51) Int. Cl.
| | | |
|---|---|---|
| *B01D 35/30* | (2006.01) | |
| *B01D 29/50* | (2006.01) | |
| *B01D 29/52* | (2006.01) | |
| *B01D 29/11* | (2006.01) | |

(52) U.S. Cl.
USPC ........ 210/253; 210/232; 210/249; 210/323.1; 210/323.2; 210/340; 210/346; 210/347; 55/341.1; 55/341.7; 55/484

(58) Field of Classification Search
USPC ........... 210/323.1, 323.2, 346, 330, 331, 340, 210/347; 55/341.1, 341.7, 484
See application file for complete search history.

(56) References Cited

U.S. PATENT DOCUMENTS

| | | | |
|---|---|---|---|
| 2,024,426 A | | 12/1935 | Butler |
| 2,843,267 A | | 7/1958 | Anderson |
| 3,195,729 A | | 7/1965 | Kracklauer et al. |
| 4,622,137 A | * | 11/1986 | Kessler ................... 210/167.13 |
| 5,256,175 A | | 10/1993 | Zievers et al. |
| 5,474,585 A | | 12/1995 | Geibel et al. |
| 6,398,837 B1 | * | 6/2002 | Alvin et al. .................... 55/486 |
| 7,081,206 B2 | | 7/2006 | Van Noland |
| 7,135,114 B2 | * | 11/2006 | Nonninger et al. ........ 210/323.1 |
| 7,922,905 B2 | | 4/2011 | Grodecki |
| 2002/0070159 A1 | | 6/2002 | Reedy |
| 2007/0095743 A1 | | 5/2007 | Grodecki |

OTHER PUBLICATIONS

International Search Report.

* cited by examiner

*Primary Examiner* — Benjamin Kurtz  
(74) *Attorney, Agent, or Firm* — Greenberg Traurig, LLP

(57) ABSTRACT

Embodiments of the invention provide a filtration system comprising a filter tank. In some embodiments, at least portions of an inlet pipe and an outlet manifold can be positioned within the filter tank. At least one manifold assembly can be coupled to the outlet manifold and also can be positioned within the filter tank. In some embodiments, the manifold assembly can include at least one first aperture, at least one second aperture, and at least one first cavity positioned within the manifold assembly. In some embodiments, the second aperture can fluidly connect the first cavity and the outlet manifold. Also, at least one filter can be coupled to the manifold assembly so that the first aperture fluidly connects the filter to the first cavity.

15 Claims, 9 Drawing Sheets

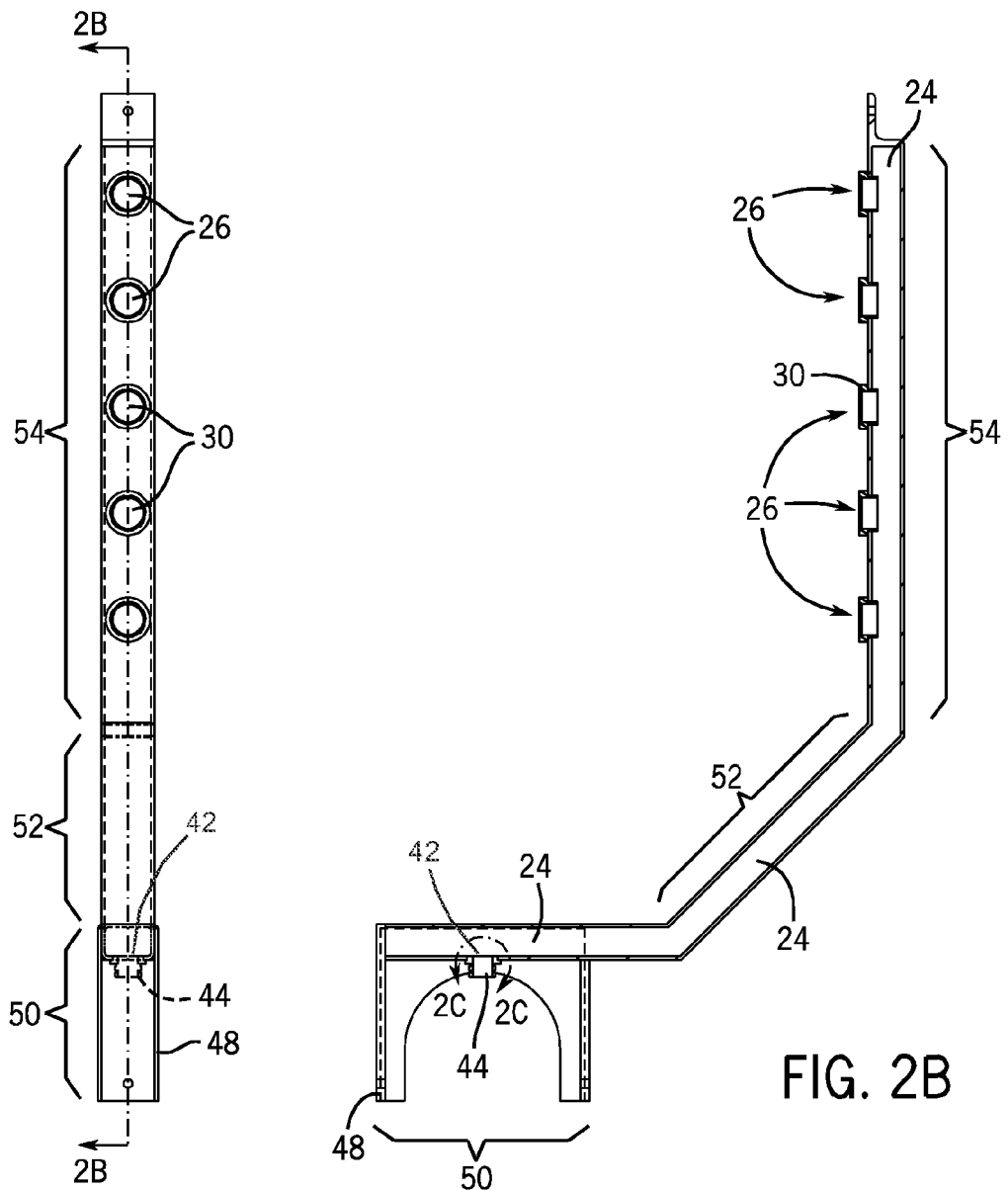
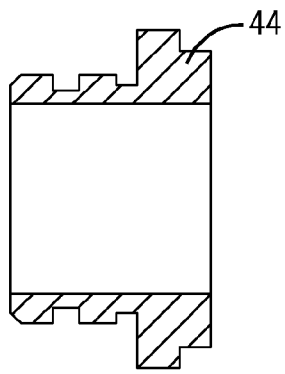
FIG. 2A
FIG. 2B
FIG. 2C

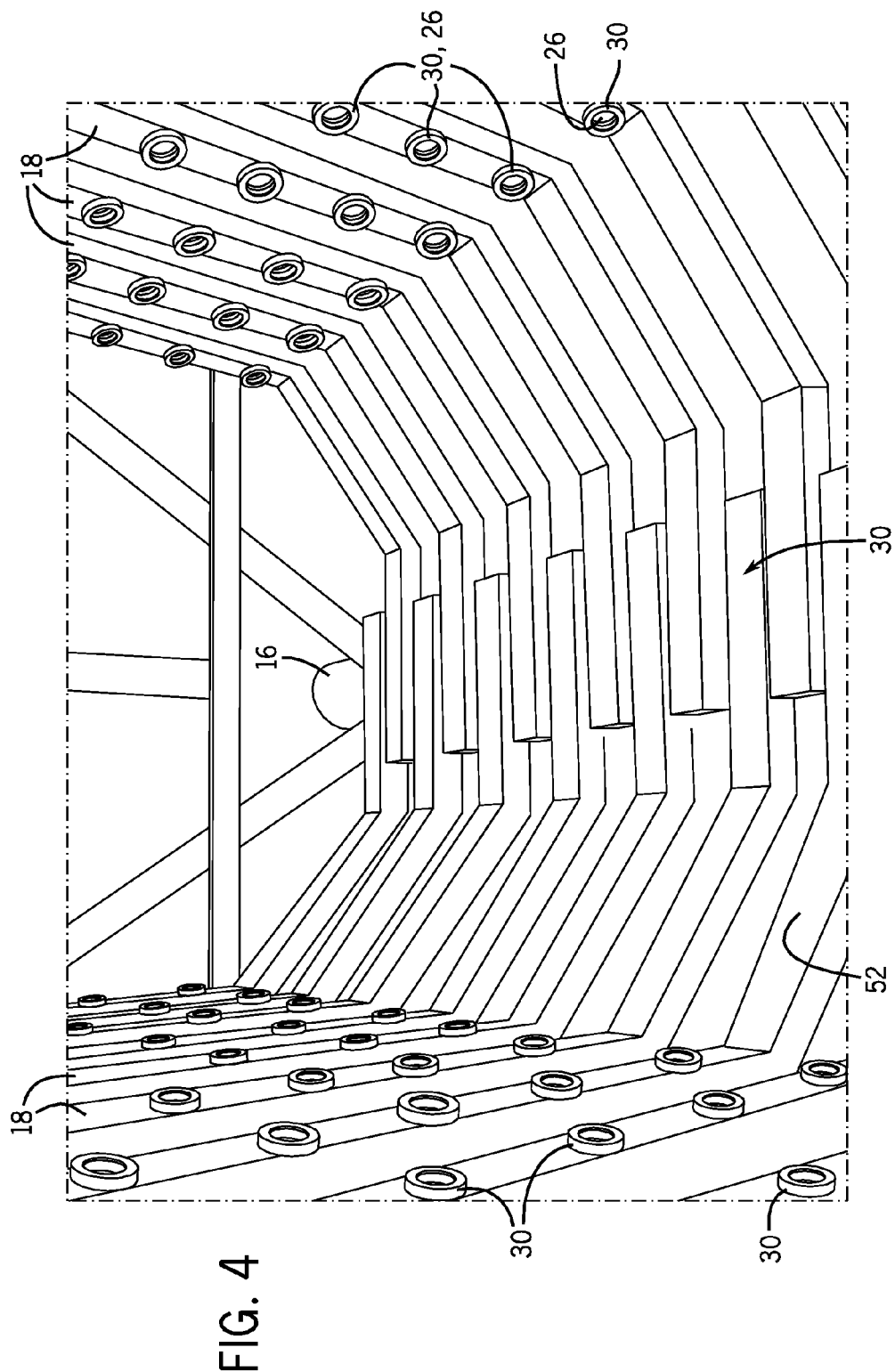

GRAVIMETRIC CONCENTRATIONS (mg/L)

| DATE | 5/5/10 | 5/5/10 | 5/6/10 | 5/6/10 | 5/10/10 | 5/10/10 | 5/11/10 | 5/11/10 | 5/12/10 | 5/12/10 | 5/14/10 | AVERAGES |
|---|---|---|---|---|---|---|---|---|---|---|---|---|
| TANK % | 70% | 60% | 98% | 90% | 90% | 80% | 75% | 65% | 70% | 60% | 80% | |
| INLET TO PILOT | 12.4 | 8.7 | 7.7 | 6.4 | 8.5 | 7.4 | 12.4 | 11.9 | 11.6 | 11.0 | 33.2 | 11.9 |
| OUTLET OF PILOT | 0.1 | 0.3 | 0.1 | 0.1 | 0.5 | 0.2 | 0.1 | 0.1 | 0.2 | 0.3 | 0.9 | 0.26 |
| OUTLET OF FILTER LEAF | 1.0 | 0.5 | 3.5 | 3.8 | 0.6 | 0.3 | 0.1 | 0.2 | 0.2 | 0.3 | 1.2 | 1.1 |

FIG. 7

GRAVIMETRIC CONCENTRATIONS (mg/L)

| DATE | 4/19/10 | 4/20/10 | | 4/21/10 | | 4/22/10 | | 4/23/10 | AVERAGES |
|---|---|---|---|---|---|---|---|---|---|
| TIME | 15:00 | 10:30 | 16:30 | 09:30 | 16:15 | 09:30 | 17:15 | 14:30 | |
| INLET TO PILOT | 10.2 | 299 | 55.6 | 24.1 | 21.7 | 7.1 | 6.5 | 27.3 | 56.4 |
| OUTLET OF PILOT | 1.2 | 1.3 | 0.9 | 2.7 | 3.6 | 3.1 | 2.3 | 4.0 | 2.4 |
| OUTLET OF FILTER LEAF | 8.7 | 40.4 | 3.4 | 2.5 | 1.8 | 2.6 | 1.3 | 1.1 | 7.7 |

FIG. 8

FILTRATION SYSTEM AND METHOD

RELATED APPLICATIONS

This application claims priority under 35 U.S.C. §119 to U.S. Provisional Patent Application No. 61/347,742 filed on May 24, 2010, the entire contents of which is incorporated herein by reference.

BACKGROUND

Different industries use filtration systems to reduce levels of contaminants in a fluid, a liquid, a gas, and/or other substances. Some filtration methods include passing a substance to be filtered through a porous medium such as a cloth, paper, sieve, filter, organic materials, etc. As the substance passes over and/or through the porous medium, at least a portion of the contaminants can be separated from the substance. In some filtration systems, pressure can be applied to the substance to be filtered to urge or direct the substance through the porous medium.

SUMMARY

Some embodiments of the invention provide a filtration system comprising a filter tank. In some embodiments, at least portions of an inlet pipe and an outlet manifold can be positioned within the filter tank. In some embodiments, at least one manifold assembly can be coupled to the outlet manifold and also can be positioned within the filter tank. In some embodiments, the manifold assembly can include at least one first aperture, at least one second aperture, and at least one first cavity positioned within the manifold assembly. In some embodiments, the second aperture can fluidly connect the first cavity and the outlet manifold. Also, at least one filter can be coupled to the manifold assembly so that the first aperture fluidly connects the filter to the first cavity.

Some embodiments of the invention provide a filtration system comprising a filter tank. In some embodiments, at least portions of an inlet pipe and an outlet manifold can be positioned within the filter tank. In some embodiments, a manifold assembly can be coupled to the outlet manifold and positioned within the filter tank. In some embodiments, the manifold assembly can include first cavity, a first region, a second region, and a third region. For example, in some embodiments, the first region can include a second aperture and a coupling member. In some embodiments, the second region can be angled relative to the first region. In some embodiments, the third region can comprise a first aperture and a receiving member. In some embodiments, at least one filter can be coupled to the manifold assembly via the receiving member.

DESCRIPTION OF THE DRAWINGS

FIG. 2A is a side view of one embodiment of a manifold assembly.

FIG. 2B is a cross-sectional view of the manifold assembly of FIG. 2A along line A-A.

FIG. 2C is a cross-sectional view of a coupling member according to one embodiment of the invention.

FIG. 4 is a perspective view an interior portion of a filter tank according to one embodiment of the invention.

FIG. 7 is a chart detailing data results on experiments on a leaf filtration system according to one embodiment of the invention.

FIG. 8 is a chart detailing data results on experiments on a leaf filtration system according to one embodiment of the invention.

DETAILED DESCRIPTION

Figure 1:
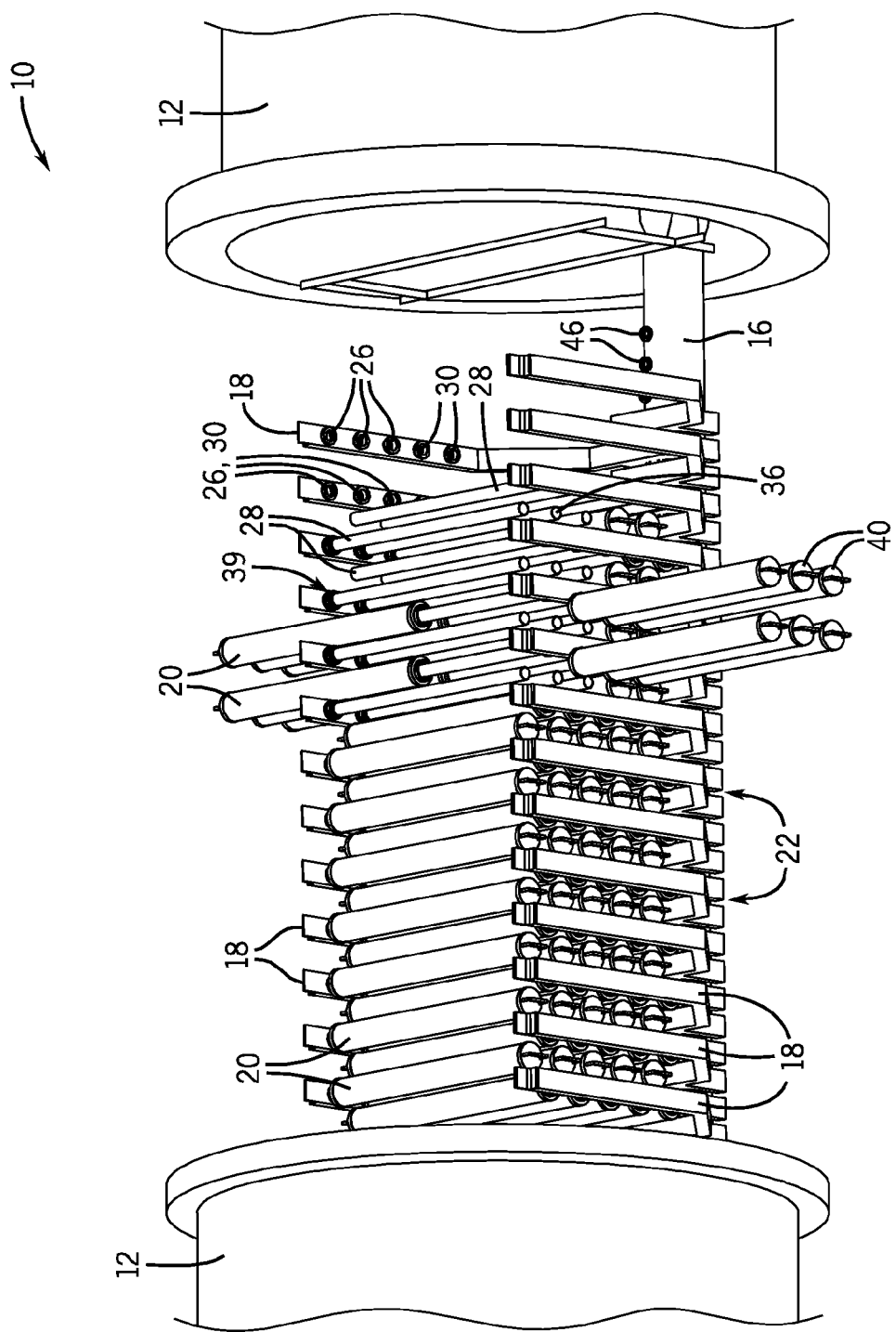
FIG. 1 is a perspective view of a leaf filtration system according to one embodiment of the invention.
Figure 3A:
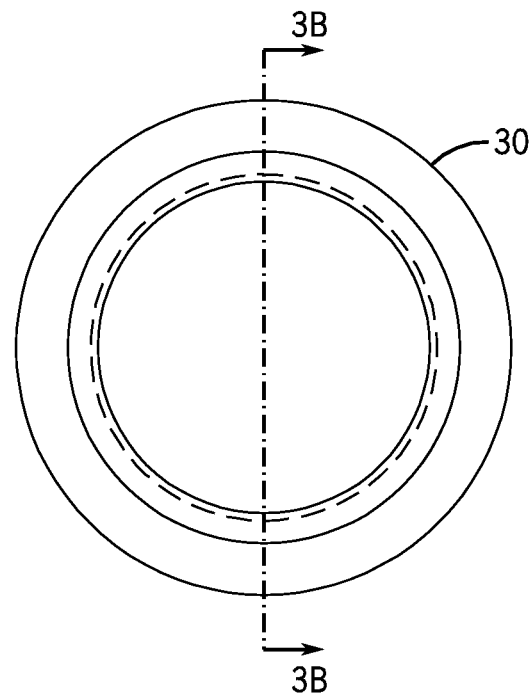
FIG. 3A is a front view of a receiving member according to one embodiment of the invention.
Figure 3B:
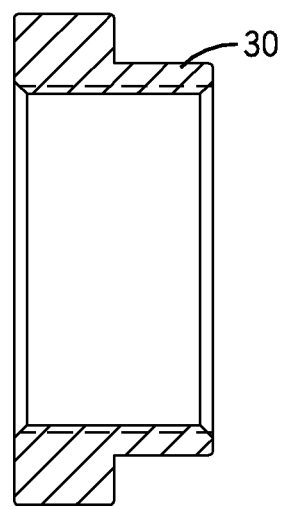
FIG. 3B is a cross-sectional view of the receiving member along line A-A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a leaf filter system 10 according to one embodiment of the invention. In some embodiments, the leaf filter system 10 can generally include a filter tank 12, an inlet pipe, an outlet manifold 16, and at least one manifold assembly 18 coupled to the outlet manifold 16, as shown in FIG. 4. In some embodiments, the inlet pipe and the outlet manifold 16 can fluidly connect the filter tank 12 with a remote reservoirs and/or sources of a fluid (e.g., any substance capable of being filtered). For example, in some embodiments, at least a portion of the inlet pipe and the outlet manifold 16 can be positioned within the filter tank 12. In some embodiments, as shown in FIG. 1, the system 10 can comprise a plurality of manifold assemblies 18 positioned substantially within an interior of the filter tank 12. Although future references to the manifold assemblies 18 are plural, a single manifold assembly 18 also can be used with the system 10. In some embodiments, a plurality of filters 20 can be coupled to at least a portion of the manifold assemblies 18. In some embodiments, the system 10 can be positioned in a vertical orientation, and in other embodiments, the system 10 also can be positioned in other orientations, such as, but not limited to horizontal, angled, or other configurations. Additionally, in some embodiments, the filter tank 12 can be configured and arranged to open and close so that users and/or manufacturers can access the interior portion of the tank 12. Also, in some embodiments, when closed, the filter tank 12 can be substantially sealed so that a substance to be filtered can enter and exit the filter tank 12 through the inlet pipe and the outlet manifold 16, respectively.

According to some embodiments of the invention, the manifold assemblies 18 can comprise different materials. For example, in some embodiments, the manifold assemblies 18 can comprise stainless steel. In other embodiments, the manifold assemblies 18 can comprise other materials such as plastics, other metals, and/or composites, or other materials capable of withstanding the environment inside of the filter tank 12.

As shown in FIGS. 2A-2C, in some embodiments, each of the manifold assemblies 18 can comprise a body 22. In some embodiments, a first cavity 24 can be positioned within the body 22. For example, in some embodiments, the first cavity 24 can comprise a substantial portion of an interior of the body 22. In other embodiments, the first cavity 24 can comprise other portions of the body 22. Moreover, in some embodiments, the first cavity 22 can be substantially defined by walls of the body 22 so that the manifold assemblies 18 are substantially hollow. In some embodiments, the manifold assemblies 18 can be formed so that the body 22 is a substantially unitary structure through methods such as molding, forging, casting, etc. In other embodiments, the walls of the body 22 can be coupled together through methods such as welding, brazing, use of conventional fasteners and/or adhesives, and other coupling techniques.

In some embodiments, each of the manifold assemblies 18 can comprise at least one first aperture 26. In some embodiments, each of the manifold assemblies 18 can comprise a plurality of first apertures 26. In some embodiments, the first apertures 26 can be positioned through a portion of the manifold assembly 18 (e.g., a wall of the manifold assembly 18). In some embodiments, the first apertures 26 can fluidly connect the first cavity 24 with an internal environment of the filter tank 12. In some embodiments, each of the manifold assemblies 18 can comprise five first apertures 26. In other embodiments, the manifold assemblies 18 can comprise other numbers of first apertures 26. In yet other embodiments, at least a portion of the manifold assemblies 18 can comprise different numbers of first apertures 26 (e.g., some manifold assemblies 18 include five first apertures 26 and some manifold assemblies 18 include more or less than five first apertures 26).

Figure 5:
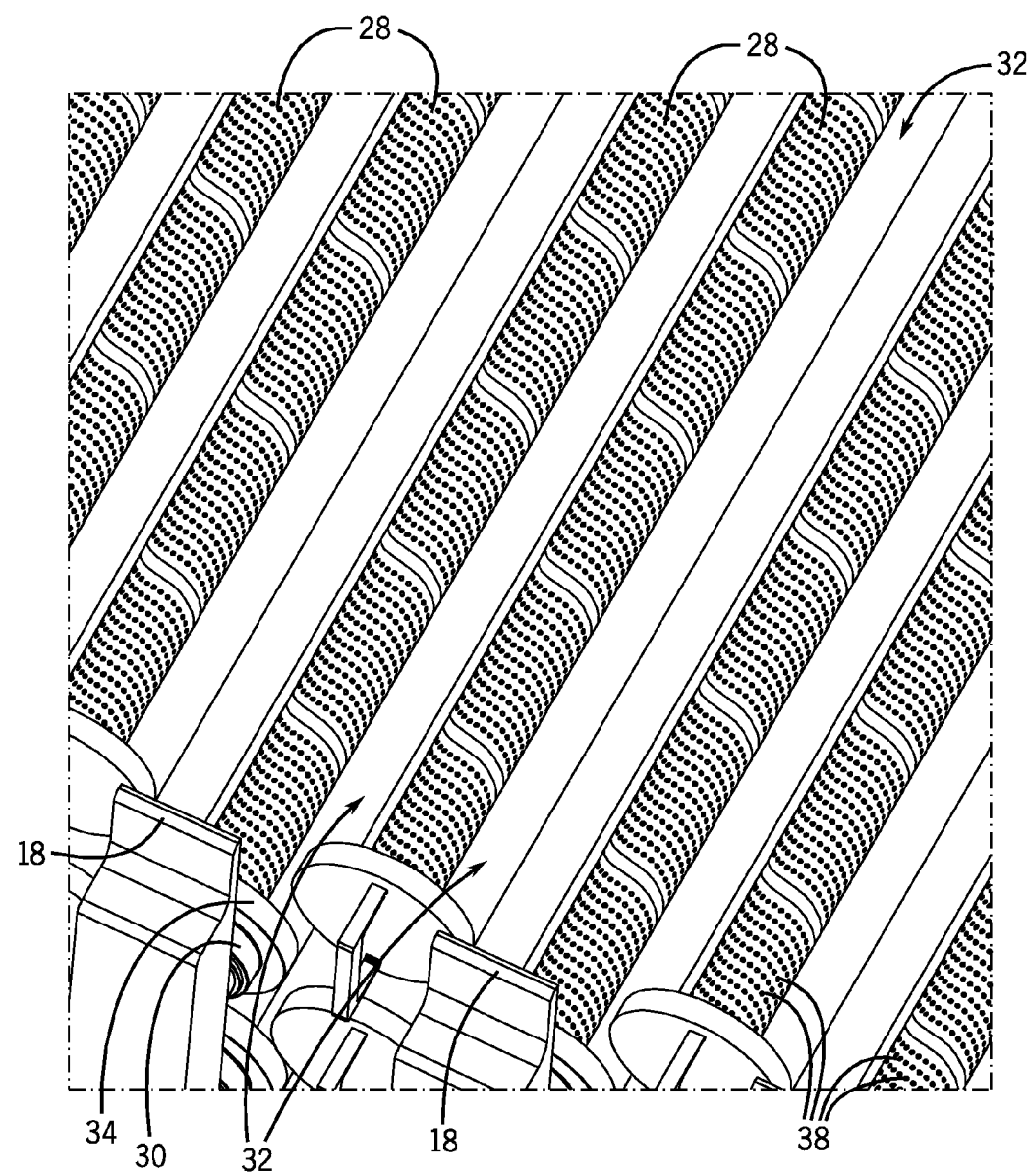
FIG. 5 is a perspective view of mandrels according to one embodiment of the invention.

As shown in FIGS. 1 and 5, in some embodiments of the invention, the system 10 can comprise at least one mandrel 28. In other embodiments, the system can comprise a plurality of mandrels 28. By way of example only, in some embodiments, the system 10 can comprise approximately the same number of mandrels 28 as first apertures 26. In some embodiments, the mandrels 28 can comprise a substantially cylindrical and/or tube-shaped structure, as shown in FIG. 5. In other embodiments, the mandrels 28 can comprise other shapes such as rectangular, regular or irregular polygonal, or other shapes. In some embodiments, at least a portion of the mandrels 28 can comprise multiple mandrel subunits coupled together to form the mandrels 28. In other embodiments, at least a portion of the mandrels 28 can be substantially a single structure.

Figure 9B:
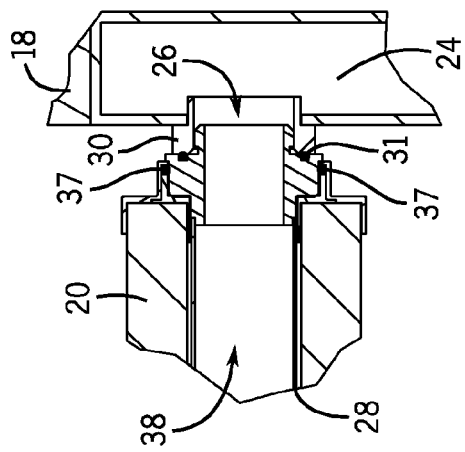
FIG. 9B is an expanded view of the region of FIG. 9A within line "B".
Figure 9A:
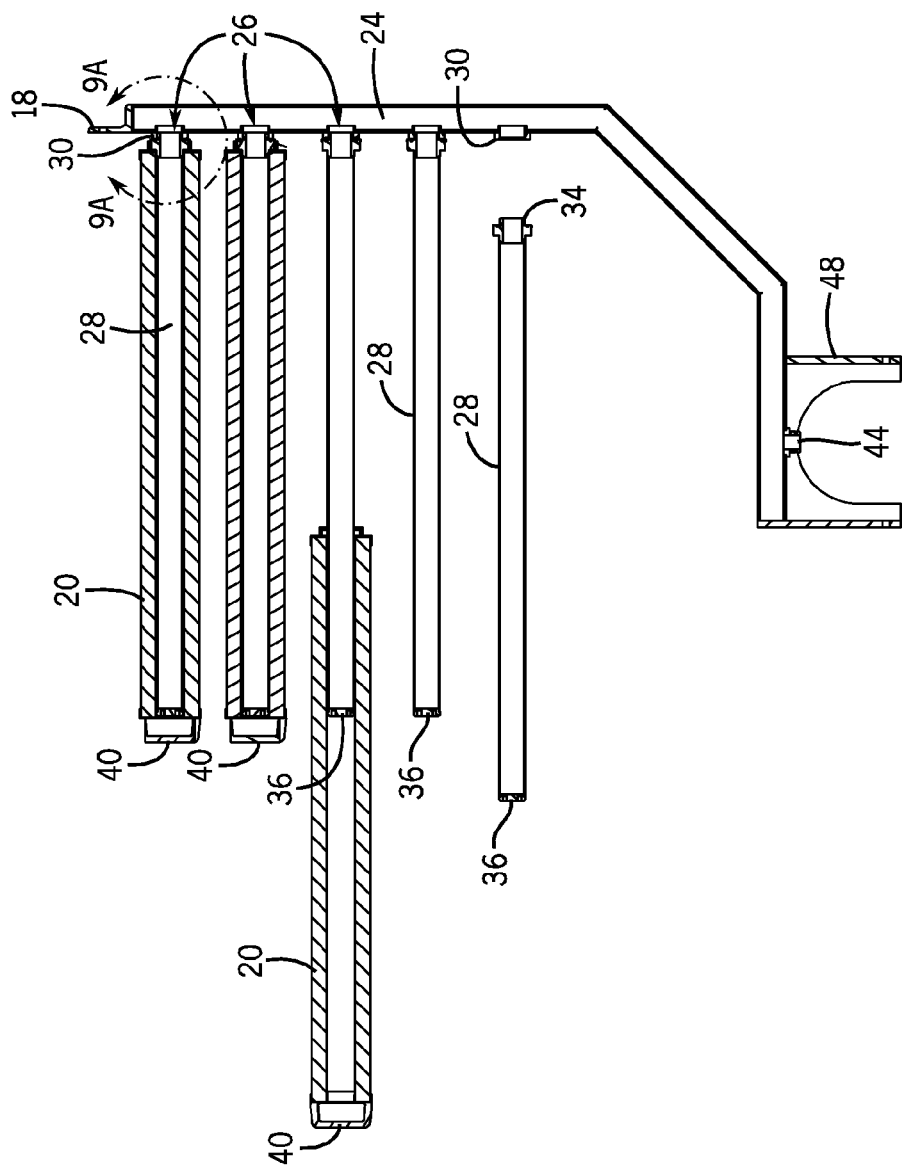
FIG. 9A is a side view of a manifold assembly, a plurality of mandrels, and a plurality of filters according to one embodiment of the invention.

In some embodiments, the first apertures 26 can be configured and arranged to receive a portion of the mandrels 28. For example, in some embodiments, receiving members 30 can be coupled to the manifold assembly 18 substantially adjacent to at least a portion of the first apertures 26 so that the receiving members 30 can at least partially retain the mandrels 28 adjacent to the first apertures 26, as shown in FIGS. 2A-3B. In some embodiments, the receiving members 30 can comprise a shape similar to that of the mandrels 28. In other embodiments, the receiving members 30 can comprise shapes substantially different than the shapes of the mandrels 28. In some embodiments, the receiving member 30 and the mandrels 28 can each comprise a threaded surface so that the two can be coupled together. In other embodiments, the mandrels 28 can be coupled to the receiving members 30 in other manners, including adhesives, conventional fasteners, welding, brazing, friction fitting, etc. In some embodiments, the receiving members 30 can be coupled to the manifold assemblies 18 and the mandrels 28 so that a fluid-tight coupling is formed. For example, as shown in FIGS. 9A and 9B, in some embodiments, at least a portion of the mandrels 28 can comprise at least one o-ring 31 configured and arranged to engage the receiving member 30 to substantially seal the coupling.

In some embodiments, the receiving members 30 and the manifold assemblies 18 can be fabricated so that the two elements are substantially integral. Additionally, in some embodiments, the mandrels 28 can be coupled directly to the manifold assemblies 18 so that the system 10 can substantially function without the receiving members 30. Moreover, in some embodiments, the mandrels 28 can be coupled to the receiving members 30 and/or the manifold assemblies 18 so that a substantially fluid-tight seal is formed.

In some embodiments, each of the mandrels 28 can comprise a mandrel cavity 32. For example, in some embodiments, the mandrels 28 can be substantially hollow so that the mandrel cavity 32 comprises a substantial interior portion of each of the mandrels 28. In some embodiments, each of the mandrels 28 can comprise an open end 34 and a closed end 36. In some embodiments, the open end 34 and the closed end 36 can substantially oppose each other. In some embodiments, when coupled to the manifold assemblies 18, the open end 34 of each of the mandrels 28 can be immediately adjacent to the first aperture 24 and the closed end 36 can be distal to the first apertures 26. As a result, in some embodiments, when coupled to the manifold assemblies 18, each of the mandrel cavities 32 can be in fluid communication with the first cavity 24 of the manifold assembly 18 to which the mandrel 28 is coupled via the open end 34. Additionally, in some embodiments, the closed end 36 of at least a portion of the mandrels 28 can be substantially permanently closed or sealed via a structure that is either permanently coupled to, or integral with the mandrels 28 to form the closed end 36. In some embodiments, the closed end 36 can be reversibly sealed (e.g., the mandrel 28 can comprise a structure such as a plug or a cap to reversibly seal the closed end 36). Additionally, in some embodiments, the mandrel 28 can comprise two open ends 34 and can function without a closed end 36.

In some embodiments, at least a portion of the mandrels 28 can comprise at least one mandrel aperture 38, as shown in FIG. 5. In some embodiments, some of the mandrels 28 can comprise a plurality of mandrel apertures 38. In some embodiments, the mandrel apertures 38 can comprise a substantially uniform size and shape. In other embodiments, the mandrel apertures 38 can comprise non-uniform sizes and shapes (e.g., different sized apertures and/or different shaped apertures). For example, in some embodiments, the mandrel apertures 38 can be positioned through a portion of the mandrels 28 so that the mandrel cavity 32 of at least a portion of the mandrels 28 can be in fluid communication with the environment of the filter tank 12. Accordingly, in some embodiments, a fluid can flow through the mandrel apertures 38 and into the mandrel cavities 32, through the first apertures 26, and then into the first cavities 24.

In some embodiments, at least a portion of the mandrels 28 can be used to couple the filters 20 to the manifold assemblies 18. In some embodiments of the invention, the filters 20 can be mounted over the mandrels 28. In some embodiments, the filters 20 can be reversibly coupled to the system 10. For example, in some embodiments, the filters 20 can be configured and arranged to move on and off of the mandrels 28 in order to remove and replace spent filters. Additionally, in some embodiments, at least one end of the filters 20 can comprise a handle 40 to aid in removal and replacement of filters 20. In some embodiments, substantially coreless and/or hollow filters 20 can be configured and arranged to receive at least a portion of the mandrels 28 so that the filters 20 can be at least partially supported by the mandrels 28. In some embodiments, one or more of the filters 20 can comprise a core or other support structure within or outside media with the filter 20. In some embodiments, the support structures can perform some or all of the functions of the mandrels 28. In some embodiments, the filters 20 can be at least partially porous and/or permeable so at least a portion of a particulate can be separated from a substance to be filtered as it passes through the filters 20. In some embodiments, different filter configurations can be chosen for different applications (e.g., a desire to remove finer and/or smaller particulate can result in selection of a filter 20 comprising a configuration to remove the finer and/or smaller particulate).

Figure 6:
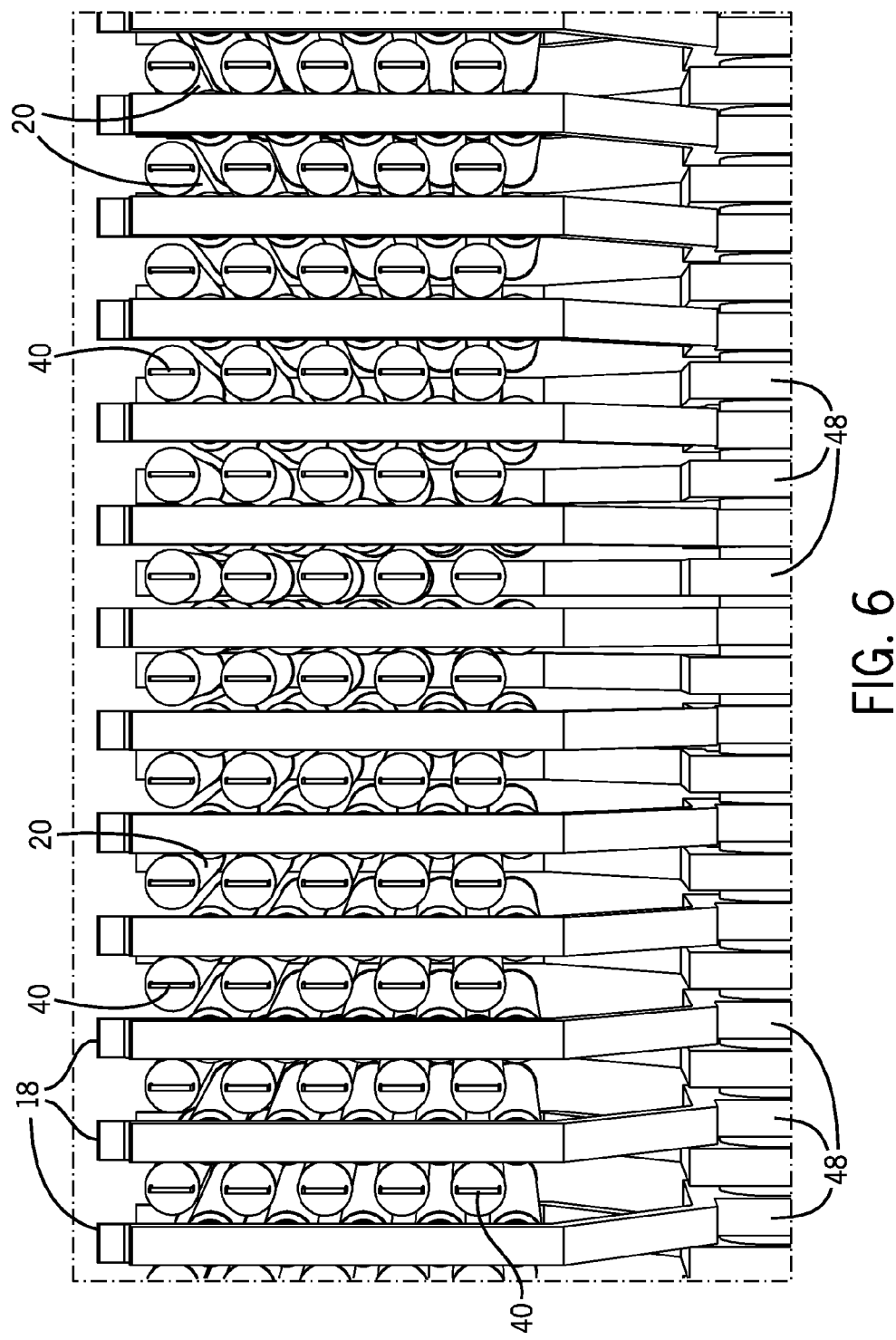
FIG. 6 is a side view of a leaf filtration system according to one embodiment of the invention.

As shown in FIG. 6, in some embodiments, the filters 20 can be coupled to the receiving members 30, the mandrels 28, and/or the manifold assemblies 18. In some embodiments, the filters 20 can be coupled via threading, friction fitting, adhesives, conventional fasteners, etc. In some embodiments, the coupling can be substantially fluid tight so that no substantial amounts of a fluid can pass through the coupling. For example, as shown in FIGS. 9A and 9B, at least a portion of the filters 20 can comprise an o-ring 37 configured and arranged to substantially seal the coupling between at least a portion of the filters 20 and the receiving members 30, the mandrels 28, and/or the manifold assemblies 18. In some embodiments, the filters 20 can comprise cartridge filters, which can be directly coupled to the manifold assemblies 18 and/or the receiving members 30 so that system 10 can function without the mandrels 28. Although, in some embodiments, both mandrels 28 and cartridge-type filters can be employed.

Moreover, in some embodiments, regardless of the configuration of the filters 20, the filters 20 can be in fluid communication with the first cavity 24. For example, in some embodiments, after at least a portion of the substance to be filtered flows through the filters 20, it can pass through mandrel apertures 38 of the mandrels 28 onto which the filters 20 are positioned. In some embodiments, after passing through some of the mandrel apertures 38, the substance can enter the mandrel cavities 32 and flow through the open ends 34 and the first apertures 26 and enter the first cavities 24. In other embodiments substantially lacking mandrels 28, the substance can flow through the filters 20 and enter the first cavities 24 via the first apertures 26. Additionally, in some embodiments, because the coupling between the filters 20 and the manifold assemblies 18, mandrels 28, and/or receiving members 30 is substantially fluid tight, any substance entering the first cavities 24 has passed through the filters 24.

Referring to FIGS. 2A-2C, in some embodiments of the invention, at least a portion of the manifold assemblies 18 can include at least one second aperture 42. In some embodiments, the second aperture 42 can be positioned through a portion of the manifold assembly 18. In some embodiments, the second aperture 42 can be substantially adjacent to the first apertures 26. In other embodiments, the second aperture 42 can be substantially distal relative to the first apertures 26. In some embodiments, the second aperture 42 of at least a portion of the manifold assemblies 18 can be in fluid communication with the first cavity 24.

In some embodiments, at least one coupling member 44 can be coupled to at least a portion of the manifold assemblies 18 so that it is immediately adjacent to the second aperture 42. In some embodiments, the manifold assembly 18 can comprise substantially the same number of second apertures 42 and coupling members 44. In some embodiments, at least a portion of the coupling members 44 can comprise a substantially hollow structure so that an internal portion of the coupling member 44 is in fluid communication with the second aperture 42 and the first cavity 24 (e.g., some of the coupling members 44 can comprise a substantially collar-like configuration).

Further, in some embodiments, at least a portion of the coupling members 44 can, at least partially, aid in coupling together at least a portion of the manifold assemblies 18 to the outlet manifold 16. In some embodiments, the outlet manifold 16 can comprise a plurality of third apertures 46. In some embodiments, at least a portion of the third apertures 46 can be configured and arranged to receive a portion of the coupling members 44. By way of example only, in some embodiments, the third apertures 46 can comprise a perimeter substantially similar to an outer perimeter of the coupling members 44. As a result, in some embodiments, the coupling members 44 can be coupled to the third apertures 46 and the outlet manifold 16 via friction fitting. In some embodiments, the coupling members 44 can be coupled to the third apertures 46 and the outlet manifold 16 via welding, brazing, conventional fasteners, adhesives, and other coupling methods. For example, in some embodiments, at least a portion of the coupling members 44 and the third apertures 46 can comprise threading configured and arranged to engage each other to couple these elements together. Additionally, in some embodiments, the coupling members 44 can be coupled to the outlet manifold 16 so that the no substantial amounts of fluid or other substances can enter the outlet manifold 16 other than via the second apertures 42.

In some embodiments, at least a portion of the manifold assemblies 18 can comprise at least one support structure 48. In some embodiments, the support structure 48 can be coupled to at least a portion of the manifold assemblies 18 adjacent to the second apertures 42 and/or the coupling member 44. In some embodiments, the support structure 48 can be coupled to the manifold assemblies 18 via welding, brazing, use of conventional fastener, adhesives, etc. In some embodiments, the support structure 48 can be configured and arranged to receive a portion of the outlet manifold 16. For example, in some embodiments, the support structure 48 can be configured and arranged so that when the coupling member 44 is coupled to the outlet manifold 16, the support structure 48 can surround a portion of an outer perimeter of the outlet manifold 16. In some embodiments, after positioning the manifold assemblies 18 relative to the outlet manifold 16, the support structure 48 can receive and/or circumscribe at least a portion of the outlet manifold 16. For example, in some embodiments, the support structure 48, after positioned on the outlet manifold 16, can be coupled to the outlet manifold to further support the manifold assembly 18. In some embodiments, the support structure 48 can be coupled to the outlet manifold 16 via welding, brazing, conventional fasteners, adhesives, etc.

As shown in FIGS. 2A-2C, in some embodiments of the invention, at least a portion of the manifold assemblies 18 can comprise at least three regions. In some embodiments, a first region 50 can be positioned so that it is substantially perpendicular to a horizontal axis of the outlet manifold 16 and can be more adjacent to the outlet manifold 16 relative to the remainder of the manifold assembly 18. In some embodiments, the first region 50 can comprise some elements of the manifold assembly 18. For example, in some embodiments, the first region 50 can comprise the support structure 48, the second aperture 48, and the coupling member 44. In some embodiments, the first region 50 of the manifold assembly 18 can be oriented in a substantially longitudinal direction, although, in other embodiments, the first region 50 can be oriented in other directions, as desired by the manufacturer and/or the end user.

In some embodiments, the manifold assembly 18 can comprise a second region 52. In some embodiments, the second region 52 can extend from the first region 50 and can be angled relative to the first region 50. For example, in some embodiments, the angle between the first region 50 and the second region 52 can be approximately forty-five degrees. In other embodiments, the second region 52 can be oriented at other angles (e.g., 30, 60, or 90 degrees) relative to the first region 50.

In some embodiments, the manifold assembly 18 can comprise a third region 54. In some embodiments, the third region 54 can extend from the second region 52. In some embodiments, the third region 54 can include some of the elements of the manifold assembly 18. For example, in some embodiments, the third region 54 of the manifold assembly 18 can comprise the first apertures 24 and the receiving members 30. Additionally, in some embodiments, the third region 54 can be angled relative to the second region 52. For example, in some embodiments of the invention, the third region 54 can be angled approximately forty-five degrees relative to the second region 52. In other embodiments, the third region 54 can be oriented at other angles (e.g., 30, 60, or 90 degrees) relative to the second region 52. Additionally, in some embodiments, because of the angled second region 52, the third region 54 can be positioned approximately ninety degrees relative to the first region 50 (i.e., substantially perpendicular).

In some embodiments of the invention, the size and angle of the regions 50-54 can aid in system 10 retrofitting. By way of example only, in some embodiments, the size of the regions (e.g., length, width, etc.) and the angle of the regions 50-54 relative to each other can be varied to accommodate differently configured and arranged conventional filter systems. Additionally, in some embodiments, at least partially dependent upon the application selected, the angles can be selected to impart superior flow characteristics to the manifold assemblies 18 relative to other filtration systems.

In some embodiments, each of the regions 50-54 can comprise individual structures coupled together to form the manifold assemblies 18. For example, in some embodiments, the first region 50, the second region 52, and the third region 54 can comprise substantially separate structures that are coupled together in the previously mentioned orientation and using any of the previously mentioned coupling techniques. Additionally, in some embodiments, by employing three sub-units later assembled to form one manifold assembly 18, the regions 50-54 can be more easily manufactured and transported. In some embodiments, each of the regions 50-54 can be regions of a substantially integrally formed structure (e.g., each of the regions of the manifold assembly is a portion of single, unitary structure).

As shown in FIGS. 1 and 6, according to some embodiments of the invention, the system 10 can be used to filter a fluid. In some embodiments, the fluid can be a liquid, a gas, a mist, or other substances requiring filtration. For example, in some embodiments, the substance to be filtered can comprise a slurry (e.g., a liquid comprising suspended particulate of uniform and/or various sizes). Although future references are to "the fluid," this term includes any substances that can require filtration. In some embodiments, the fluid can be pressurized. For example, in some embodiments, the fluid can originate from a storage tank (not shown) or other source, whether remote or a part of the system 10. In some embodiments, the fluid, which can be pressurized, can enter the filter tank 12 via the inlet pipe, which can fluidly connect the interior of the filter tank 12 with the source of the fluid. In some embodiments, the pressure can at least partially urge, direct, and/or force at least a portion of the fluid to flow through the filters 20 and the remainder of the system 10. In some embodiments, as previously mentioned, as the fluid flows through the filters 20, at least a portion of the particulate, debris, contaminants, waste, or other materials suspended within the fluid can be separated from the fluid so that the fluid becomes a filtrate. Moreover, because of the substantially fluid-tight couplings, the filtrate flows through the first apertures 26 and enters the first cavities 24. In some embodiments, because the first cavities 24 are in fluid communication with the second apertures 42 and the filtrate is pressurized, at least a portion of the filtrate can flow from the first cavities 24 through the second apertures 42 and into the outlet manifold 16. In some embodiments, once in the outlet manifold 16, the filtrate can be directed to flow to a filtrate reservoir or other destinations for use in chosen application. Moreover, in some embodiments, the system 10 can comprise a plurality of filter tanks 12 each including manifold assemblies 18 so that the fluid can pass through several stages of filtration (e.g., the filter tanks 12 can comprise a "daisy-chain" configuration).

In some embodiments, the system 10 can be employed in different applications. As a result, in some embodiments, system 10 can comprise different size, shapes, configurations, densities, properties, and/or dimensions of the manifold assemblies 18, the mandrels 28, and/or the filters 20 to filter a given fluid at a given rate and/or to remove certain substances from the fluid. By way of example only, in some embodiments, the system 10 can comprise a plurality of differently configured filters 20, which can separate different sized particles while within one filter tank 12. Moreover, in some embodiments, different numbers of manifold assemblies 18, first apertures 26, and or filters 20 can be used to impart a modular property upon the system 10 (i.e., the system 10 can be easily adaptable to different filtration needs).

In some embodiments, by employing the system 10, including the manifold assemblies 18 and the filters 20, filtration can be simplified and undesirable processes and by-products can be avoided. By way of example only, some conventional leaf filter systems can employ diatomaceous earth in the filtering process. The diatomaceous earth can substantially function as a filter media so that as the fluid to be filtered flows over, around, and/or through the diatomaceous earth, at least a portion of the undesired particulate can be removed. Although the diatomaceous earth can function as a filtration substrate, its use can substantially increase costs associated with conventional leaf filter systems. The diatomaceous earth of some conventional leaf filter systems can include silica, which can pose health concerns for those who work with it. In some conventional leaf filter systems, after the diatomaceous earth is substantially spent (e.g., saturated with filtered matter), it must be removed from the conventional system and disposed of in a proper manner, which can create a significant cost point for conventional systems because of the high costs of used diatomaceous earth disposal. Also, at times, the diatomaceous earth could pass through the filters of conventional leaf filter systems, which could contaminate downstream applications.

Additionally, in order to employ diatomaceous earth in a conventional leaf filter system, the diatomaceous earth should form a "cake." For example, the diatomaceous earth should be positioned so that at least a portion of the substance to be filtered flows over the cake to filter the substance. However, to keep the cake in place, some conventional leaf filter system must always circulate a fluid or other substance through the cake to keep it properly positioned. Accordingly, if the fluid is not circulating through the cake, the cake can dry and its structural integrity can be comprised so that it would have to be replaced. For example, if a power outage occurs and fluid cannot be circulated through the conventional leaf filter system, the cake could be destroyed, which could lead to a decrease in leaf filter productivity and increased manual labor in reapplying diatomaceous earth to the conventional system.

According to some embodiments of the invention, the system 10 does not include diatomaceous earth or analogous filtration aids. As a result, at least some of the drawbacks associated with diatomaceous earth can be avoided. For example, in some embodiments, the system 10 can provide for the ability to stop and start flow of fluids to be filtered without concern for whether a diatomaceous earth cake would be disrupted. Additionally, in some embodiments, the operating costs and the costs of disposal can be reduced by not including diatomaceous earth. Moreover, in some embodiments, the volumes of waste produced by the filtration can be reduced in the system 10 because no spent diatomaceous earth is created by the filtration process. In some embodiments, less labor can be necessary to maintain the system 10 relative to conventional systems. For example, the handles 40 can increase simplicity in filter 20 removal and replacement relative to conventional systems that can require diatomaceous earth removal and replacement.

In some embodiments, the system 10 can comprise other advantages over conventional leaf filter systems. For example, in some embodiments, because of the pressure, the fluid can be forced to flow through the filters 20. In some embodiments, at least a portion of the filters 20 can have a lower flow rate per filter relative to conventional leaf filter systems because conventional leaf filters can use a smaller number of larger-sized filters. As a result, the lower flow rate per filter can lead to enhanced filtration.

EXAMPLES

The following examples and experimental results are included to provide those of ordinary skill in the art with a complete disclosure and description of particular manners in which some embodiments of the present invention can be practiced and evaluated, and are not intended to limit the scope of the invention.

This example illustrates an embodiment of the leaf filtration system 10. In order to determine the effectiveness of the system 10 relative to conventional leaf filters, the fluid to be filtered was fed through both a conventional leaf filter (labeled "Filter Leaf" in data tables) and a leaf filter system (labeled "pilot" in the data tables) under substantially similar experimental conditions (e.g., flow rate, system pressure, differential pressure, period of use, etc.).

In order to determine impact of the system 10 on filtration relative to conventional leaf filter systems, the concentration of the fluid's contaminants was measured before and after passing through the filtration systems. Additionally, experimental samples were taken over the course of several days to more accurately determine the impact of the system 10. In order to determine the concentration of contaminants present in the different conditions, a fixed volume of liquid was passed through an analytical membrane. The membrane was rinsed, dried, and weighed to assess the mass of the contaminants in the fluid sample. As discussed below, the filtration loop including the system 10 exhibited improved filtration relative to conventional leaf filters.

As shown in FIGS. 7 and 8, some embodiments of the system 10 were able to produce a filtrate with a lesser concentration of contaminants compared to conventional leaf filters. For example, as shown in FIG. 7, after five days of filtration through both the system 10 and conventional filters, both filtration systems removed a significant proportion of the contaminants. On average, the system 10 removed 97.8% of the contaminants, whereas the conventional leaf filtration system removed 90.1% of the contaminants. However, when directly compared, the system 10 removed 76% more contaminants compared to the conventional leaf filtration system.

The second experiment further supports theses results. As shown in FIG. 8, after four days of filtration through both the system 10 and conventional filters, once again, both systems removed a significant proportion of the contaminants. On average, the system 10 removed 95.7% of the contaminants, whereas the conventional leaf filter system removed 86.3%. When directly compared, however, the system 10 removed 70% more contaminants compared to the conventional leaf filter system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A filtration system comprising:
   a filter tank;
   at least one outlet manifold, at least a portion of the outlet manifold positioned within the filter tank;
   at least three interleaved manifold assemblies coupled to the outlet manifold and positioned substantially adjacent within the filter tank so that at least one of the three interleaved manifold assemblies extends outwardly from the outlet manifold in one direction and at least one of the three interleaved manifold assemblies extends outwardly from the outlet manifold in a substantially opposite direction, each of the manifold assemblies including:

at least one first non-linear cavity comprising three fluidly coupled regions including:
a first region including at least one second aperture through a portion of the manifold assembly, the at least one second aperture fluidly connecting the at least one first non-linear cavity and the outlet manifold; and
a third region including at least one first aperture through a portion of the manifold assembly,
a second region angled relative to the first region and the third region angled relative to the second region defining the non-linearity of the at least one first non-linear cavity,
at least one filter coupled to the manifold assembly so that the at least one first aperture fluidly connects the at least one filter to the at least one first non-linear cavity; and
wherein the at least one filter extends generally inwardly towards the first region and the second region.

2. The filtration system of claim 1, and further comprising a plurality of first apertures positioned through a portion of each of the interleaved manifold assemblies.

3. The filtration system of claim 1, and further comprising at least one support structure coupled to each of the interleaved manifold assemblies, wherein the at least one support structure is configured and arranged to receive a portion of the outlet manifold.

4. The filtration system of claim 1, and further comprising at least one receiving member coupled to each of the interleaved manifold assemblies immediately adjacent to the at least one first aperture.

5. The filtration system of claim 4 and further comprising at least one mandrel coupled to the at least one receiving member and adjacent to the at least one first aperture, wherein the at least one filter is at least partially supported by the at least one mandrel; and
wherein the at least one mandrel is configured and arranged to be capable of being positioned substantially parallel to the first region.

6. The filtration system of claim 5, wherein the at least one mandrel comprises at least one mandrel aperture and a mandrel cavity, wherein the at least one mandrel aperture and the mandrel cavity are fluidly connected to the at least one first non-linear cavity via the at least one first aperture.

7. The filtration system of claim 1, wherein the at least one filter comprises a handle.

8. The filtration system of claim 1 and further comprising a coupling member coupled to each of the interleaved manifold assemblies substantially adjacent to the at least one second aperture.

9. A filtration system retrofittable into a filter tank comprising:
at least three substantially adjacently positioned interleaved manifold assemblies, each manifold assembly coupled to an outlet manifold and positioned substantially adjacent within the filter tank so that at least one of the three interleaved manifold assemblies extends outwardly from the outlet manifold in one direction and at least one of the three interleaved manifold assemblies extends outwardly from the outlet manifold in a substantially opposite direction,
and each manifold assembly including;
a first non-linear cavity comprising three fluidly coupled regions including;
a first region including a second aperture through a portion of the manifold assembly and a coupling member coupled to the manifold assembly adjacent to the second aperture,
a second region angled relative to the first region, and
a third region including at least one first aperture positioned through a portion of the manifold assembly and at least one receiving member coupled to the manifold assembly adjacent to the at least one first aperture, and including at least one mandrel coupled to the manifold assembly, the mandrel including a mandrel cavity and at least one mandrel aperture, wherein the mandrel cavity and the at least one mandrel aperture are in fluid communication with the first cavity via the at least one first aperture,
the third region angled relative to the second region so as to at least partially define the non-linearity of the first non-linear cavity;
at least one filter coupled to the manifold assembly via the receiving member;
wherein the at least one mandrel is positioned substantially parallel to the first region.

10. The filtration system of claim 9, wherein the coupling member is capable of coupling with an outlet manifold positioned within the filter tank through at least one third aperture, the third aperture configured and arranged to receive at least a portion of the coupling member.

11. The filtration system of claim 10, wherein each of the first aperture, the second aperture, and the third aperture are in fluid communication with the first non-linear cavity.

12. The filtration system of claim 9, wherein the angle between the first region and the second region is approximately forty-five degrees.

13. The filtration system of claim 9, wherein the angle between the second region and the third region is approximately forty-five degrees.

14. The filtration system of claim 9, wherein each of the interleaved manifold assemblies comprises a plurality of first apertures.

15. The filtration system of claim 9, wherein the at least one filter is configured and arranged to receive a portion of the at least one mandrel.

* * * * *